United States Patent
Bauerle

(10) Patent No.: US 9,925,915 B2
(45) Date of Patent: Mar. 27, 2018

(54) LUMINOUS SIGNALING GLAZING UNIT, VEHICLE INCORPORATING SAME AND MANUFACTURE

(71) Applicant: SAINT-GOBAIN GLASS FRANCE, Courbevoie (FR)

(72) Inventor: Pascal Bauerle, Roye (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 15/528,184

(22) PCT Filed: Nov. 23, 2015

(86) PCT No.: PCT/FR2015/053171
§ 371 (c)(1),
(2) Date: May 19, 2017

(87) PCT Pub. No.: WO2016/079459
PCT Pub. Date: May 26, 2016

(65) Prior Publication Data
US 2017/0327031 A1 Nov. 16, 2017

(30) Foreign Application Priority Data
Nov. 21, 2014 (FR) ..................... 14 61308

(51) Int. Cl.
*B60Q 1/00* (2006.01)
*B60Q 1/26* (2006.01)
(Continued)

(52) U.S. Cl.
CPC ........... *B60Q 1/268* (2013.01); *B60Q 1/2696* (2013.01); *B60Q 1/34* (2013.01); *B60Q 1/46* (2013.01); *F21S 10/02* (2013.01)

(58) Field of Classification Search
CPC ............................... B60Q 1/268; B60Q 1/2696
(Continued)

(56) References Cited

U.S. PATENT DOCUMENTS

2005/0238857 A1   10/2005   Day
2009/0046355 A1*   2/2009   Derda ................... B32B 17/10
                                              359/359
(Continued)

FOREIGN PATENT DOCUMENTS

DE   10 2013 003686 A1   9/2014
FR      2 986 854 A1     8/2013
(Continued)

OTHER PUBLICATIONS

International Search Report as issued in International Patent Application No. PCT/FR2015/053171, dated Feb. 15, 2016.
(Continued)

*Primary Examiner* — Sean Gramling
*Assistant Examiner* — Gerald J Sufleta, II
(74) *Attorney, Agent, or Firm* — Pillsbury Winthrop Shaw Pittman LLP

(57) ABSTRACT

A vehicle luminous signaling glazing unit forming a front windshield, includes a first glazing pane, forming the exterior glazing pane, with first and second main faces F1, F2; a lamination interlayer made of a polymeric material of thickness e1 of at most 1.8 mm; and a second glazing pane, forming the interior glazing pane, with third and fourth main faces F3, F4, the face F2 and the face F3 being the internal faces of the laminated glazing unit; and a set of diodes on a front face of a PCB board, the assembly being of thickness et2≤e1, each diode emitting in the direction of the interior glass, and each diode having an edge face. For each of the diodes, the lamination interlayer comprises a through-aperture encircling the edge face of the diode, and the lamination interlayer is between face F3 and the front face of the PCB board.

28 Claims, 5 Drawing Sheets

(51) Int. Cl.
*B60Q 1/34* (2006.01)
*B60Q 1/46* (2006.01)
*F21S 10/02* (2006.01)

(58) Field of Classification Search
USPC .................................. 362/503, 540, 545
See application file for complete search history.

(56) References Cited

U.S. PATENT DOCUMENTS

| | | | |
|---|---|---|---|
| 2009/0114928 A1* | 5/2009 | Messere | B32B 17/10 257/88 |
| 2010/0060821 A1 | 3/2010 | Wang et al. | |
| 2010/0090597 A1* | 4/2010 | Werners | B32B 17/10036 313/512 |
| 2015/0353003 A1* | 12/2015 | Salter | B60Q 1/268 362/510 |
| 2017/0232886 A1* | 8/2017 | Dellock | B60Q 1/50 362/510 |

FOREIGN PATENT DOCUMENTS

| | | |
|---|---|---|
| WO | WO 2012/028820 A1 | 3/2012 |
| WO | WO 2014/020249 A1 | 2/2014 |

OTHER PUBLICATIONS

International Preliminary Report on Patentability and then Written Opinion of the International Searching Authority as issued in International Patent Application No. PCT/FR2015/053171, dated May 23, 2017.

* cited by examiner

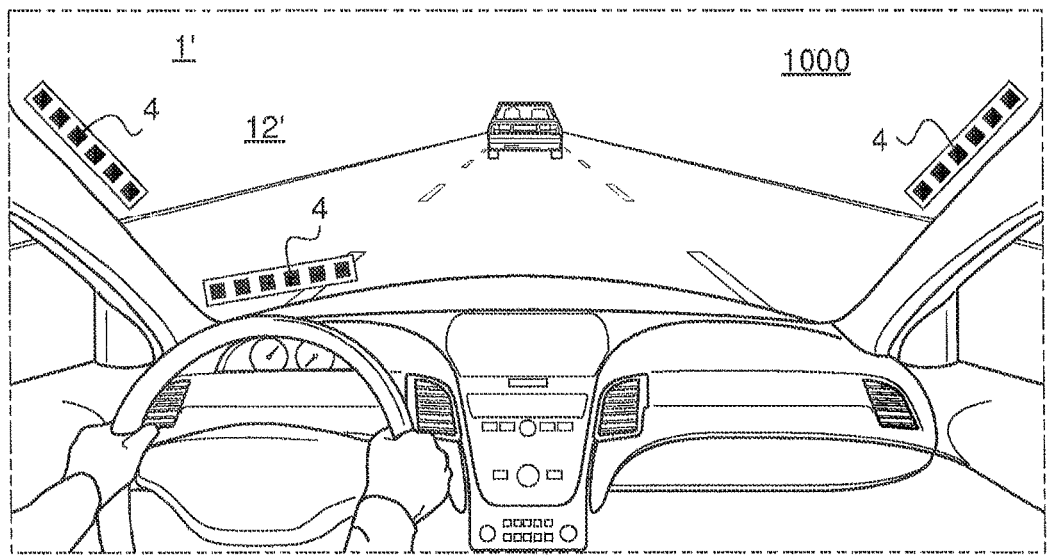
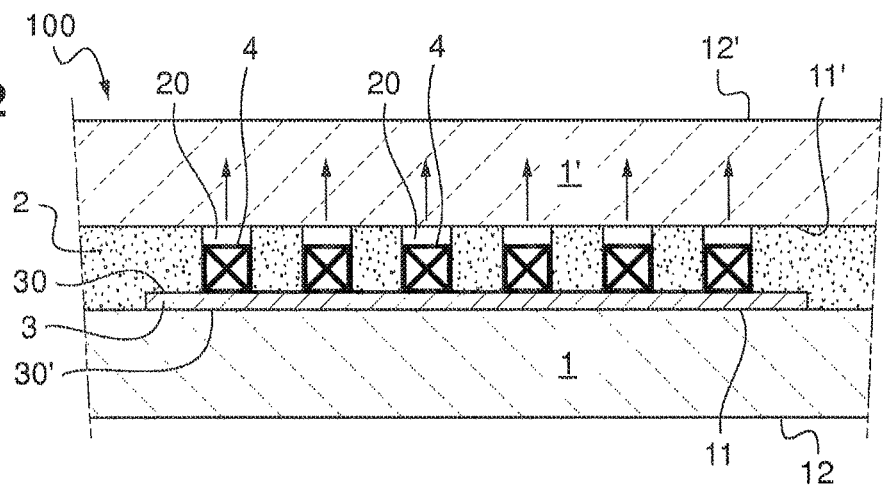
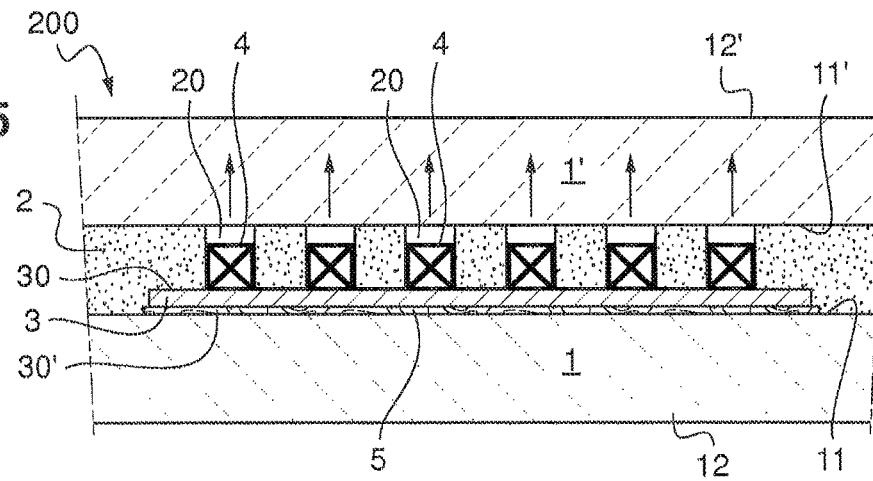

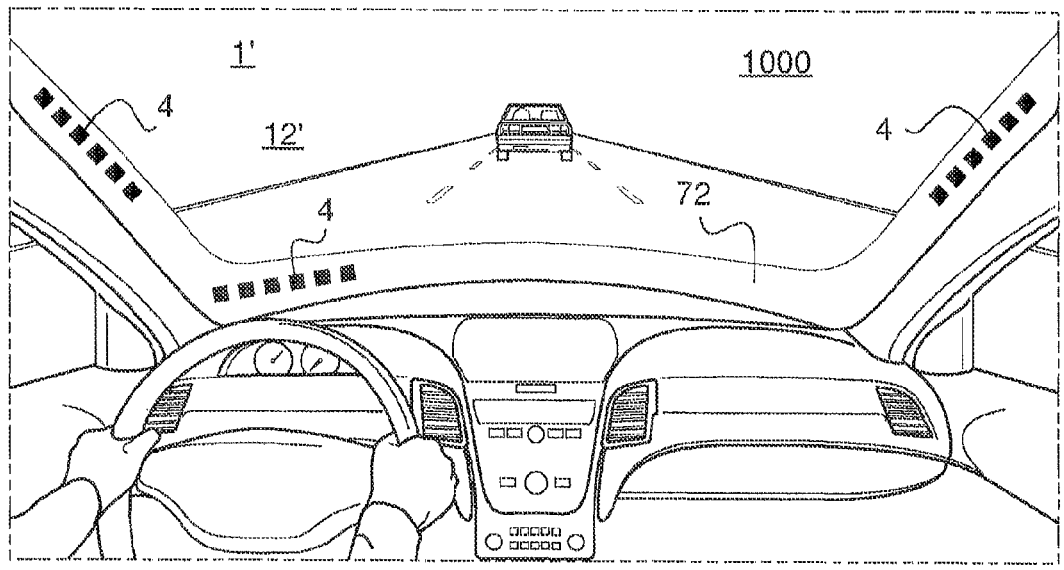
Fig.1bis
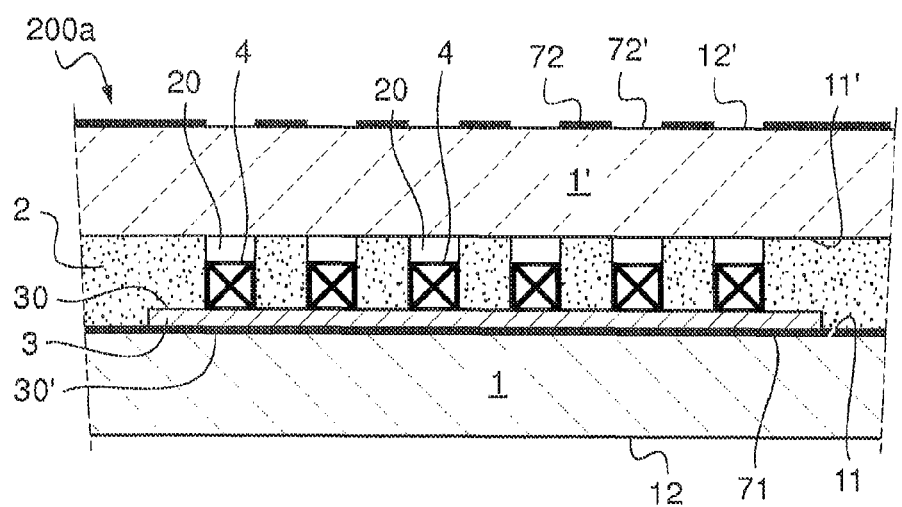
Fig.2bis

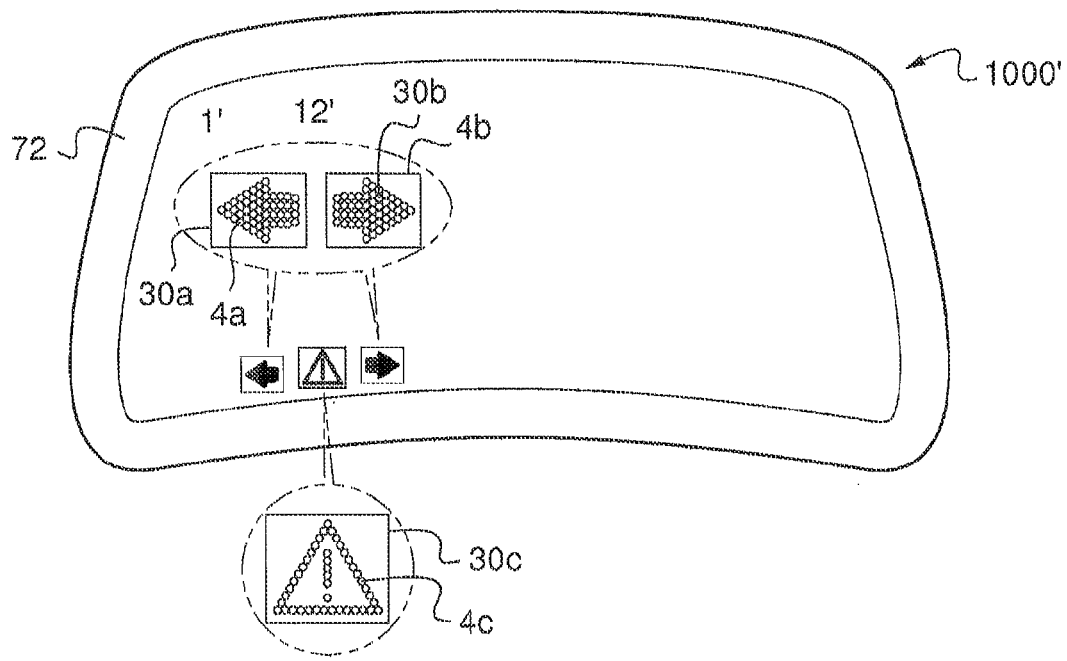
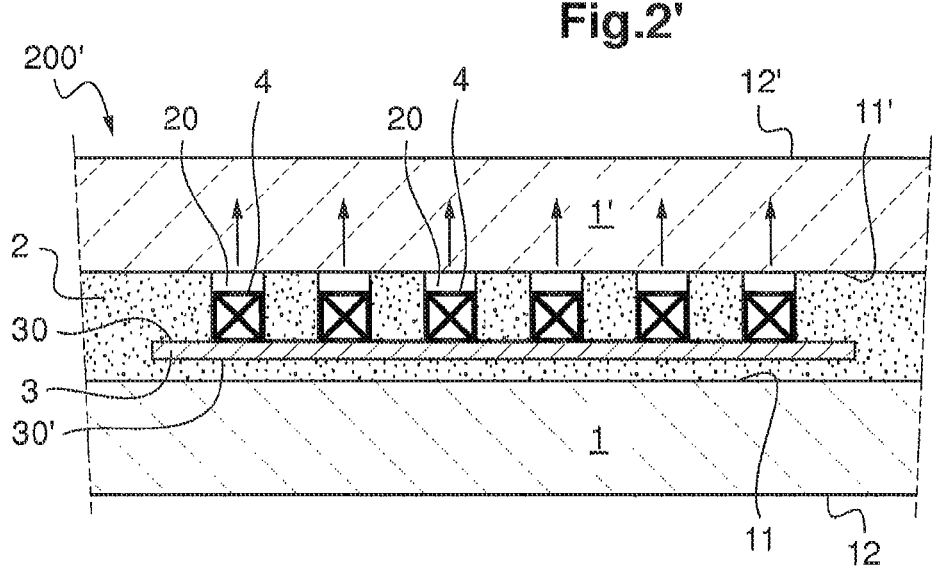

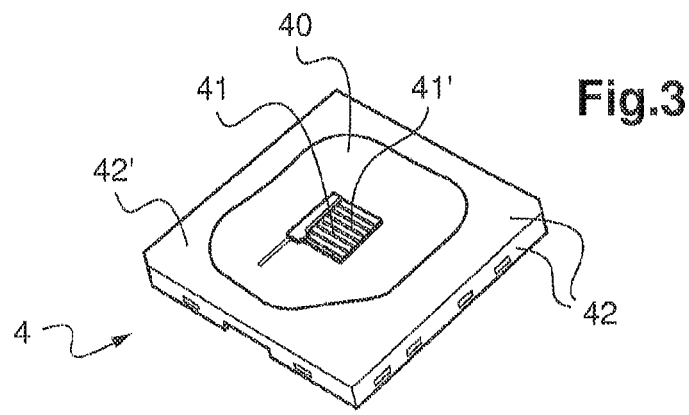
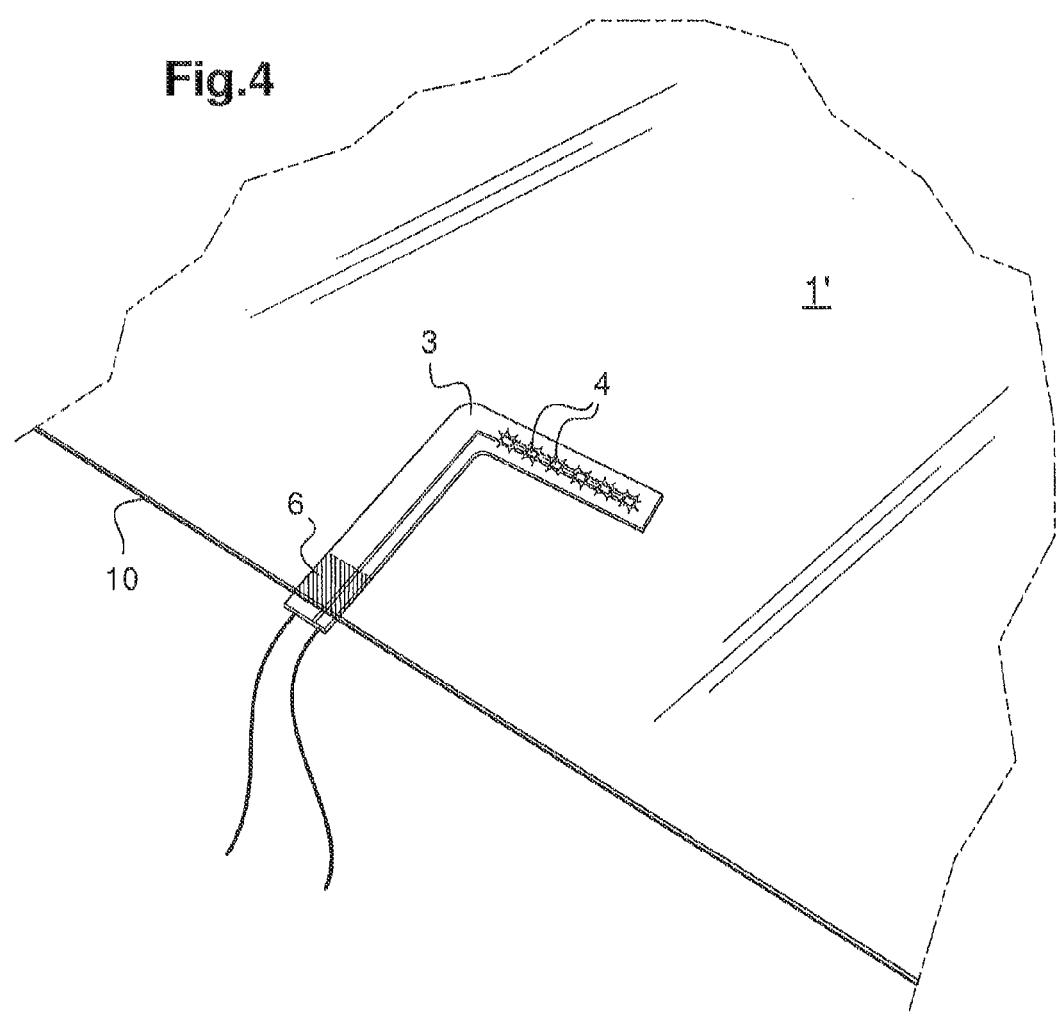

LUMINOUS SIGNALING GLAZING UNIT, VEHICLE INCORPORATING SAME AND MANUFACTURE

CROSS-REFERENCE TO RELATED APPLICATIONS

This application is the U.S. National Stage of PCT/FR2015/053171, filed Nov. 23, 2015, which in turn claims priority to French patent application number 1461308 filed Nov. 21, 2014. The content of these applications are incorporated herein by reference in their entireties.

The invention relates to a luminous signaling glazing unit and to a vehicle including such a glazing unit and to the manufacture of such a glazing unit.

Front windshields increasingly integrate head-up displays (HUDs).

Document DE102013003686 describes a luminous laminated glazing unit forming a front windshield or rear windshield of an automotive vehicle, integrating diodes on a printed circuit board (PCB) in order to deliver luminous signals to alert the driver.

More precisely, in the embodiment described with reference to FIG. 2 of this document, the luminous signaling front windshield comprises:
 a laminated glazing unit including:
  a first glazing pane forming the exterior glazing pane, with first and second main faces;
  a lamination interlayer and
  a second glazing pane forming the Interior glazing pane, with third and fourth main faces;
 the second and third faces being the internal faces of the glazing unit; and
 a set of diodes on a printed circuit board, said diodes being able to emit a red signaling light to warn the driver,
  each diode having an emitting face emitting in the direction of the interior glass,
 the lamination interlayer containing a through-aperture in which the PCB board is placed for its integration.

The scrappage rate for this glazing unit could be improved and its production cost thus decreased.

For this purpose, the first subject of the present invention is a luminous signaling glazing unit for a vehicle front windshield comprising:
 a laminated glazing unit including:
  a first glazing pane, made of optionally clear, extra-clear or tinted, especially grey or green, and preferably curved mineral glass forming the exterior glazing pane, with first and second main faces respectively called face F1 and face F2, of thickness of preferably at most 2.5 mm and even of at most 2 mm—especially 1.9 mm, 1.8 mm, 1.6 mm and 1.4 mm—or even of at most 1.3 mm or at most 1 mm;
  an optionally clear, extra-clear or tinted, especially grey or green, lamination interlayer made of a preferably thermoplastic polymeric material and better still of polyvinyl butyral (PVB), of thickness e1 of at most 1.8 mm, better still of at most 1.2 mm and even of at most 0.9 mm (and better still of at least 0.38 mm and even of at least 0.7 mm), especially set back from the edge face of the first glazing pane by at most 2 mm and set back from the edge face of a second glazing pane by at most 2 mm; and
  a second glazing pane made of preferably curved and preferably clear or extra-clear or even tinted mineral glass forming the interior glazing pane, with third and fourth main faces, face F3 and face F4, respectively, preferably of thickness smaller than that of the first glazing pane, even of at most 2 mm—especially 1.9 mm, 1.8 mm, 1.6 mm and 1.4 mm—or even of at most 1.3 mm or at most 1 mm, the total thickness of the first and second glazing panes preferably being strictly smaller than 4 mm and even than 3.7 mm, the face F2 and the face F3 being the internal faces of the laminated glazing unit; and
 a set of inorganic light-emitting diodes on a face called the front face, facing the face F3, of a PCB printed circuit board, said diodes being able to emit signaling light, each diode having an emitting face able to emit in the direction of the interior glazing pane, and each diode having an edge face, the PCB board and diodes assembly being of total thickness et2, the diodes being of thickness e2 and the PCB board being of thickness e'2 and et2≤e1,
the lamination interlayer having a through-aperture,
and, according to the Invention, for each of the diodes, the lamination interlayer comprises a through-aperture encircling the edge face of the diode, and, especially in the space called the inter-diode space between neighboring diodes, the lamination interlayer is between the face F3 and the front face of the PCB board, the lamination interlayer being between the face F3 and the front face of the PCB board over the entirety of the front face of the PCB ex level with the diodes.

Cutting an aperture into which the PCB would fit in its entirety, as done in the prior art, increased the risk of defective assembly (bubbles, delamination, aesthetic defects). Thus, the present invention proposes to cut the lamination interlayer locally. Moreover, the diodes are no thicker than the interlayer, in order not to weaken the glass.

Similarly, the second subject of the present application is an automotive signaling glazing unit chosen from a rear windshield and a side window, comprising;
 a laminated glazing unit including:
  a first glazing pane, made of especially curved and optionally clear, extra-clear or tinted, especially grey or green, mineral glass forming the exterior glazing pane, with first and second main faces respectively called face F1 and face F2, preferably of thickness of at most 2.5 mm and even of at most 2 mm—especially 1.9 mm, 1.8 mm, 1.6 mm and 1.4 mm—or even of at most 1.3 mm or at most 1 mm;
  an optionally clear, extra-clear or tinted, especially grey or green, lamination interlayer made of a preferably thermoplastic polymeric material and better still of PVB, of thickness e1 of at most 1.8 mm, better still of at most 1.2 mm and even of at most 0.9 mm (and better still of at least 0.38 mm and even of at least 0.7 mm), especially set back from the edge face of the first glazing pane by at most 2 mm and set back from the edge face of a second glazing pane by at most 2 mm; and
  a second glazing pane made of especially curved and optionally clear, extra-clear or tinted, especially grey or green, mineral glass forming the interior glazing pane, with third and fourth main faces, face F3 and face F4, respectively, preferably of thickness smaller than that of the first glazing pane, even of at most 2 mm—especially 1.9 mm, 1.8 mm, 1.6 mm and 1.4 mm—or even of at most 1.3 mm or at most 1 mm, the total thickness of the first and second glazing panes preferably being strictly smaller than 4 mm and even than 3.7 mm, the face F2 and the face F3 being the internal faces of the laminated glazing unit; and a set of inorganic light-emitting diodes on a face called the front face, facing the face F3, of a PCB printed circuit board, said diodes being able to emit signaling light, each diode having an emitting face (of a semiconductor chip) able to emit in the direction of the exterior glazing pane, and each diode having an edge face, the PCB board and diodes assembly being of total thickness et2, the diodes being of thickness e2 and the PCB board being of thickness e'2 and et2≤e1, the lamination interlayer having a through-aperture, and, according to the Invention, for each of the diodes, the lamination interlayer comprises a through-aperture encircling the edge face of the diode, and, especially in the space called the inter-diode space between neighboring diodes, the lamination interlayer is between the face F2 and the front face of the PCB board, the lamination interlayer being between the face F2 and the front face of the PCB board over the entirety of the front face of the PCB ex level with the diodes.

The expression "side window" according to the Invention encompasses vent and quarter windows.

The lamination interlayer is preferably as close as possible to the diodes and, preferably taking into account the positional tolerance of the diodes during the cutting, preferably chosen to be wider than the width of the diodes (even if the interlayer is flexible). In one preferred embodiment, the lamination interlayer is spaced apart by at most 0.5 mm and better still at most 0.2 mm or even 0.1 mm from the edge face of the diodes and even makes contact with the edge face of the diodes.

In one preferred embodiment, e1 is subcentimeter-sized and preferably between 0.7 and 0.9 mm (in particular 0.76 mm for conventional PVB and for example 0.81 mm for acoustic PVB), and preferably e1−et2<0.5 mm and even preferably e1−et2 ranging from 0.1 to 0.3 mm. e1 is naturally the thickness between the face F2 and the face F3.

In particular, in one embodiment, the lamination interlayer is formed from a single, preferably PVB (clear, extra-clear or tinted) leaf with the through-apertures, and the back face is against or adhesively bonded to the face F2 of the front windshield or to the face F3 of the rear windshield or side window.

In another embodiment, the preferably PVB lamination interlayer may also be present between the back face of the PCB board and the face F2 of the front windshield or between the back face of the PCB board and the face F3 of the rear windshield or the side window; the thickness e'1 is defined between the back face and the face F2 of the front windshield or between the back face of the PCB board and the face F3 of the rear windshield or side window. Preferably et2≤5e1−e'1 (in addition to et2≤e1). An (especially clear, extra-clear or tinted) leaf (which may be thinner of thickness e'1 for example of at most 0.38 mm and even of at most 0.2 mm) is added to the back-face side of the PCB board. This leaf is preferably of the same extent as the leaf with the apertures.

The thickness allowance of the interlayer may be as small as possible (relative to the diodes) in order not to risk generating too many air bubbles.

Preferably, a single sheet (of PVB) may be used for the Interlayer for economic reasons (material cost and simply a series of local cuts to perform).

Use of a single sheet (of PVB) preferably of standard 0.78 mm or 0.81 mm thickness (for enhanced safety rather than 0.38 mm) is made possible by the choice of new ultra-thin power diodes that have only very recently become commercially available.

As mentioned above, it is possible to use two (or more) leaves (preferably of PVB) as indicated for additional mechanical strength. For example:

a leaf with through-apertures of thickness of at most 0.4 mm and especially of 0.38 mm; and another leaf of thickness e'1 of at most 0.4 mm, especially of 0.38 mm and even at most 0.2 mm and especially of 0.19 mm.

If the diodes (and the PCB board) are sufficiently thin an Inversion may even be possible. For example:

a leaf (preferably of PVB) with through-apertures of thickness of at most 0.4 mm, especially of 0.38 mm and even of at most 0.2 mm and especially of 0.19 mm; and another sheet (preferably of PVB) of thickness of at most 0.4 mm and especially of 0.38 mm.

In one preferred embodiment, each preferably power diode is an electronic component including a semiconductor chip, and is equipped with a peripheral polymeric or ceramic package encapsulating the edge face of the electronic component (and defining the edge face of the diode), said package projecting over the front face of the component and encircling the semiconductor chip, the lamination interlayer (because of creep during the lamination) extends as far as to be between said front surface of the package and the face F3 of the front windshield or the face F2 of the side window or the rear windshield.

The package may correspond to the maximum thickness (height) of the diode. The package is for example made of epoxy. A polymeric package may possibly sag (the final thickness after lamination may be smaller than the initial thickness) during the lamination. The (polymeric) package may be opaque.

The diode may be devoid of optical elements (lens etc.) above the semiconductor chip in order to facilitate compactness; however, the optical element may be sufficiently small to be integrated into the laminated glazing unit. The diode may comprise a protective resin or a material having a color conversion function, conventionally on the semiconductor chip. The semiconductor chip may be embedded in a material (resin etc.).

When the lamination interlayer is brought into contact with the PCB board, the lamination interlayer may be spaced apart by at most 0.5 mm and better still at most 0.1 mm from the edge face, and after lamination, because of creep, the lamination interlayer may be closer to and even make contact with the edge face and even project over the front face of the component, while encircling the semiconductor chip.

Preferably, the diodes are components surface mounted on the front face of the PCB board and the diodes have a Lambertian or quasi-Lambertian emission pattern.

In one preferred embodiment, the lamination interlayer is made of PVB, e1 ranging from 0.7 to 0.9 mm and e'1, if relevant, being at most 0.4 mm, and the diodes are components surface mounted on the front face of the PCB board, e'2 being at most 0.2 mm, better still at most 0.15 mm and even at most 0.05 mm.

The width of the PCB board is preferably at most 5 cm, better still at most 2 cm and even at most 1 cm. The width (or length) of a diode with a single semiconductor chip, generally a diode of square shape, is preferably at most 5 mm. The length of a diode with a plurality of semiconductor chips (typically encircled by the package), generally of rectangular shape, is preferably at most 20 mm and better still at most 10 mm.

The PCB board (which is preferably flexible enough to follow the curvature of a curved laminated glazing unit) may be adhesively bonded or pressed against the face F2 for the front windshield or the face F3 for the rear windshield or side window, adhesive bonding with an adhesive (glue or preferably double-sided adhesive) of thickness e3 with e3≤0.1 mm, better still e3≤0.05 mm—even such that e3+e'2 is at most 0.15 mm and better still at most 0.1 mm. With this adhesive preferably e3+et2≤e1 (above all if present on the back face of the PCB in the zone of the diodes).

The adhesive bonding is over the entire length or discrete, in zones containing and/or not containing diodes.

The diodes are preferably power diodes that in operation are undersupplied electrically with current, preferably by a factor of at least 10 and even of at least 20 (therefore a current/10 or even current/20) especially so as to maintain a temperature below the softening temperature of the polymeric material of the lamination interlayer, in particular at most 130° C., better still at most 120° C. and even at most 100° C.

These diodes guarantee an excellent efficacy without too much heating.

For example, for diodes supplied with current at 1 A, between 50 and 100 mA is chosen.

The inorganic diodes are for example based on gallium phosphide or aluminum gallium and gallium nitride.

The PCB board may be sufficiently flexible (bendy) to follow the curvature of a curved laminated glazing unit.

In one embodiment, the PCB board includes a film made of a preferably transparent plastic, preferably polyethylene terephthalate or PET or polyimide, provided with conductive tracks, especially made of metal or a transparent conductive oxide, which tracks are preferably transparent, and is equipped with surface mount diodes. The conductive tracks are printed or deposited by any other deposition method, for example physical vapor deposition. The conductive tracks may also be wires. It is preferable for the conductive tracks and the film to be transparent when they are visible i.e. they are not masked by a masking element (layer) (such as an enamel or even a coat of paint, etc.) especially on face F4 or F3 for the front windshield and on face F2 for the side window or rear windshield. The conductive tracks may be transparent because they are made of a transparent material or because they are sufficiently thin to be (almost) invisible.

Polyimide films have a better resistance to higher temperatures relative to the alternative PET or even PEN (polyethylene naphthalate).

Preferably, the PCB board extends at least as far as to the edge face of the laminated glazing unit, and preferably protrudes beyond the edge face (preferably of bent shape and better still L-shaped), and between the back face of the PCB board and the face F2 of the front windshield or the face F3 of the rear windshield or the side window, is housed seal that is tight to a liquid water and, of thickness of at most 0.1 mm and better still at most 0.05 mm, especially a double-sided adhesive. Such an adhesive is preferred to an overmolding solution. It may be a question of the preferably transparent adhesive used to fix (all) the PCB board.

The bent, especially L-shaped PCB board may include a first (rectangular) portion bearing the diodes (with the bend) and a (rectangular) second portion for connection opening onto and even protruding beyond the edge face of the laminated glazing unit. This second portion may be (much) longer than the first portion.

The glazing unit (front windshield, rear windshield, side window) may include a plurality of signaling lights with the same function or separate functions.

In order to obtain a larger signaling area and/or different colors, it is possible to have on a given PCB board a plurality of rows of diodes or even to place side-by-side two PCB boards (at least the zones of the PCBs with diodes being placed side-by-side).

On a given PCB board, the diodes may emit the same light or light of different colors, preferably not at the same time.

Conventionally, the diodes are in (at least) one row forming a luminous strip along one longitudinal or lateral edge of the front windshield (driver-side) or the rear windshield or side window.

Naturally, the lamination interlayer may make direct contact with the face F3 (F2, respectively) or with a conventional functional coating on this face, especially a thin-film multilayer (including one or more sliver films) such as: a heating layer, antennae, a solar-control or low-E layer or a decorative or (opaque) masking layer such as a generally black enamel.

The PCB board may be in the glazed area and optionally spaced apart from the opaque edges (enamel frame in general). For example, the PCB board is placed along one lateral or longitudinal edge or even more centrally especially substantially midway between the lateral edges and even closer to the bottom longitudinal edge (In the fitted position) than to the top longitudinal edge. Most often, there is an opaque layer on face F2 and an opaque layer on face F4 or even F3. Their widths are identical or different.

The PCB board (at least the zone with the diodes or at least the zone without the diodes if the PCB is bent especially into an L) may be arranged in or in the vicinity of the region of an opaque layer, especially a (back) enamel, along a peripheral edge of the laminated glazing unit, generally on face F2 and/or face F4 or even on face F2 and/or on face F3.

In a first embodiment, the PCB board may even be placed in a region of the front windshield, region in which the exterior glass is rendered entirely (or partially) opaque by the (outermost) opaque layer, such as a (black) enamel, preferably on F2. This opaque layer may be in this region of the front windshield an unapertured layer (continuous background) or a layer with apertures (areas without opaque layer) for example a layer taking the form of a set of geometric (round, rectangular, square, etc.) or nongeometric patterns of identical or different sizes (of size that decreases with distance from the edge face and/or patterns the spacing of which increases with distance from the edge face).

In this first embodiment, the diodes or even the entire PCB board may be visible only from the interior, in order to display information—such as a warning (anti-collision) to a driver or even to any other person—without limiting the view of the driver through the front windshield.

The PCB board may be placed in a region of the front windshield, region in which the interior glass is rendered opaque by an opaque layer (the innermost) such as a (black) enamel preferably on F4 or even on F3. This opaque layer then includes apertures (by masking on deposition or by removal especially with a laser) at least in line with the diodes. This opaque layer for example takes the form of a set of opaque geometric (round, rectangular, square, etc.) or nongeometric patterns of identical or different sizes (of size that decreases and/or patterns the spacing of which increases with distance from the edge face). Zones between the opaque patterns are in line with the diodes. In these zones, a scattering layer such as a white enamel may be added to face F4 or even F3. The scattering layer may be spaced apart from or contiguous with this (Innermost) opaque layer. Preferably, the front windshield in addition includes the opaque layer on face F2.

The PCB board may be placed in a region of the rear windshield or side window, region in which the interior glass is rendered opaque by the opaque layer (the innermost) preferably on F4 or even on F3. In this embodiment, the diodes or even the entire PCB board is visible only from the exterior, in order to form any sort of light or information. This opaque layer may be in this region of the rear windshield or side window an unapertured layer (continuous background) or a layer with apertures (areas without opaque layer) for example a layer taking the form of a set of geometric (round, rectangular, square, etc.) or nongeometric patterns of identical or different sizes (of size that decreases and/or patterns the spacing of which increases with distance from the edge face) in particular an enamel. Preferably, the rear windshield or side window in addition includes the opaque layer on face F4 or even F3.

The PCB board may be placed in a region of the rear windshield or side window, region in which the exterior glass is rendered opaque by an opaque layer (the outermost) such as a (black) enamel preferably on F2. This opaque layer then includes apertures (by masking on deposition or by removal especially with a laser) at least in line with the diodes. This opaque layer for example takes the form of a set of opaque geometric or nongeometric patterns (round, rectangular, square, etc.) of Identical or different sizes (of size that decreases and/or patterns the spacing of which increases with distance from the edge face). Zones between the opaque patterns are in line with the diodes. In these zones, a scattering layer such as a white enamel may be added to face F2. The scattering layer may be spaced apart from or contiguous with this opaque layer. Preferably, the rear windshield or side window in addition includes the opaque layer on face F4 (or F3).

For visual comfort or to form a more uniform sign, the front windshield may include on the face F3 or (better still) the face F4 facing the diodes a preferably white scattering layer, in particular a (white) enamel. Especially for visual comfort, the side window or rear windshield may include facing the diodes a preferably white scattering layer on the face F2 (or even F1), in particular a (white) enamel. A set of (white) scattering patterns of the size of the diodes may be provided or even a scattering layer forming a sign such as a pictogram.

The scattering layer may be in a zone of the glazed region or as already indicated in a peripheral zone with an opaque layer, such as the black enamel, with apertures in line with the diodes.

In particular, for the rear windshield or side window, the diodes may be arranged to form one or more letters, a symbol (triangle, fault or hazard symbol, etc.), an arrow, etc. using one or more PCB boards, etc.

In particular, for the front windshield, the diodes may be arranged to form one or more letters, a symbol (triangle, fault or hazard symbol, etc.), one or more arrows (lights representing the left and right indicators) etc., using one or more PCB boards. As many PCB boards and sets of diodes such as described above as required may be provided. For example:
  a first set along a left lateral edge preferably closer to the bottom longitudinal edge than the top longitudinal edge;
  a second set along a right lateral edge preferably closer to the bottom longitudinal edge than the top longitudinal edge;
  a third set along the bottom longitudinal edge preferably on the driver side; and
  a fourth set in the center preferably closer to the bottom longitudinal edge than the top longitudinal edge.

Color may change depending on danger level or a larger or smaller number of diodes may be turned on depending on the danger level.

The invention of course relates to any vehicle including at least one luminous signaling glazing unit such as described above and in particular:
  the luminous signaling glazing unit forms a front windshield and is an (open road (freeway) or even urban) anti-collision means especially preventing collisions by detecting when the distance to the automobile (or any other means of locomotion such as a motorbike, bicycle, mobility scooter etc. or even an animal) in front (or an object or a person such as a pedestrian) is too small, or even by detecting when a distance from an object or a person or an automobile or even any other means of locomotion (bicycle, motorbike, etc.) on the left-hand or right-hand side of the automobile is too small, and turning on the preferably red or, more gradually, orange (amber) then red diodes, or even diodes with three or more levels and therefore colors;
  or the luminous signaling glazing unit forms the rear windshield and is a glazing unit including a stop light (for example of at least 60 cd), a third stop light (for example between 25 and 80 cd), an indicator (for example of at least 50 cd), a hazard warning light or a light for locating the vehicle; and/or
  the luminous signaling glazing unit forms a side window and is a glazing unit including a hazard warning light (for when the car breaks down, etc.) or a light for locating the vehicle (when stopped, in a parking lot, in town, etc.) or a side repeater (front side window, especially near the side mirror—in order to be seen when the vehicle is overtaking or being overtaken, for example between 0.6 and 20 cd).

It is also possible to form position lights, parking lights and/or sidelights.

By way of diodes mention may be made of the range OSLON BLACK FLAT sold by OSRAM. For red light, mention may be made of the diode sold by OSRAM: OSLON BLACK FLAT Lx H9PP. For orange (amber) light, mention may be made of the diode sold by OSRAM: LCY H9PP. For white light, mention may be made of the diode sold by OSRAM: LUW H9QP or KW HxL531.TE where x=the number of chips in the diode (for example 4 or 5).

By way of flexible PCB mention may be made of the range of products AKAFLEX® (especially PCL FW) from KREMPEL.

In one embodiment of the vehicle, it includes at least one control unit for piloting the diodes and even at least one sensor especially for detecting dangerous situations. A control unit for piloting the diodes may be in the laminated glazing unit, on or off the PCB board.

The invention lastly relates to a process for the luminous signaling glazing unit such as described above in that it includes the following steps:
  automatically cutting (using a robot) a lamination interlayer taking the form of a single sheet (preferably of PVB) preferably of at most 0.9 mm and even of at most 0.4 mm thickness to form preferably as many (and no more) local through-apertures (geometric apertures:

round, square, rectangular etc., and especially apertures of the same shape as the diodes) as there are diodes or, the lamination interlayer (preferably of PVB) including a first sheet and a second sheet, especially of at most 0.4 mm and even of at most 0.2 mm thickness, automatically cutting the first sheet of at most 0.9 mm thickness to form local through-apertures; and assembling the laminated glazing unit, with through-apertures larger than the size of the diodes, preferably larger by at most 1 mm, better still 0.5 mm or even at most 0.2 mm or 0.1 mm, the optional second sheet being between the back face of the PCB board and the face F2 of the front windshield or between the back face of the PCB board and the face F3 of the rear windshield or side window.

The diodes may be placed on the front face manually or automatically (higher precision).

A conventional PVB such as the RC41 from Solutia or Eastman may be chosen. The PCB board with the diodes may be positioned relative to a glazing pane (back-face side of the PCB board) and constrain the positioning of the apertured lamination interlayer, the lamination interlayer preferably being cut to be larger than the outline of the glazing unit (the excess being cut away after the front-face side glazing pane has been put in place), or indeed the PCB board with the diodes may be positioned relative to the apertured lamination interlayer and be constrained by the positioning of the latter, the lamination interlayer preferably being cut to the exact shape of the laminated glazing unit.

In the present description, the term side window or side window designates the same thing.

The present invention is now explained in more detail with reference to the appended figures in which:

FIG. 1 shows a front windshield of an automotive vehicle on a road, the windshield being provided with luminous signaling means according to the invention.

FIG. 1' shows another front windshield of an automotive vehicle on a road, the windshield being provided with luminous signaling means according to the invention.

FIG. 1bis shows another front windshield of an automotive vehicle on a road, the windshield being provided with luminous signaling means according to the invention.

FIG. 2 is a schematic cross-sectional view of a luminous signaling front windshield in a first embodiment of the invention.

FIG. 2' is a schematic cross-sectional view of a luminous signaling front windshield in one variant of the first embodiment of the invention.

FIG. 2bis is a schematic cross-sectional view of a luminous signaling front windshield in one variant of the first embodiment of the Invention.

FIG. 3 shows a perspective view of a diode used in the first embodiment.

FIG. 4 shows a partial schematic top view of the front windshield of the first embodiment.

FIG. 5 is a schematic cross-sectional view of a luminous signaling front windshield in a second embodiment of the invention.

Figure 6:
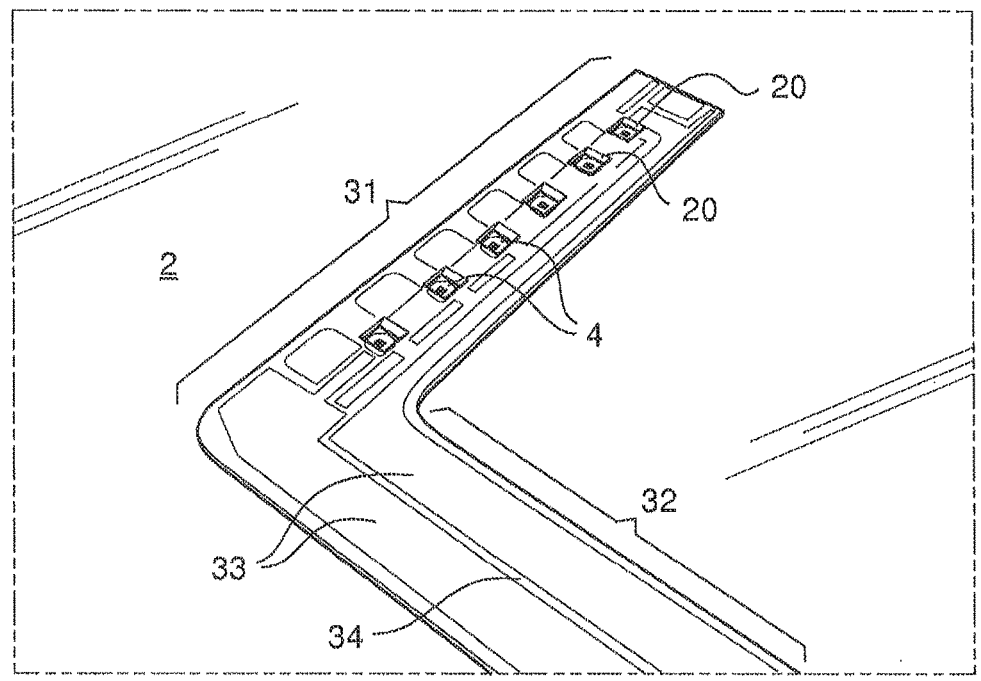

FIG. 6 is a schematic view showing the front windshield in FIG. 2 being manufactured.

Figure 7:
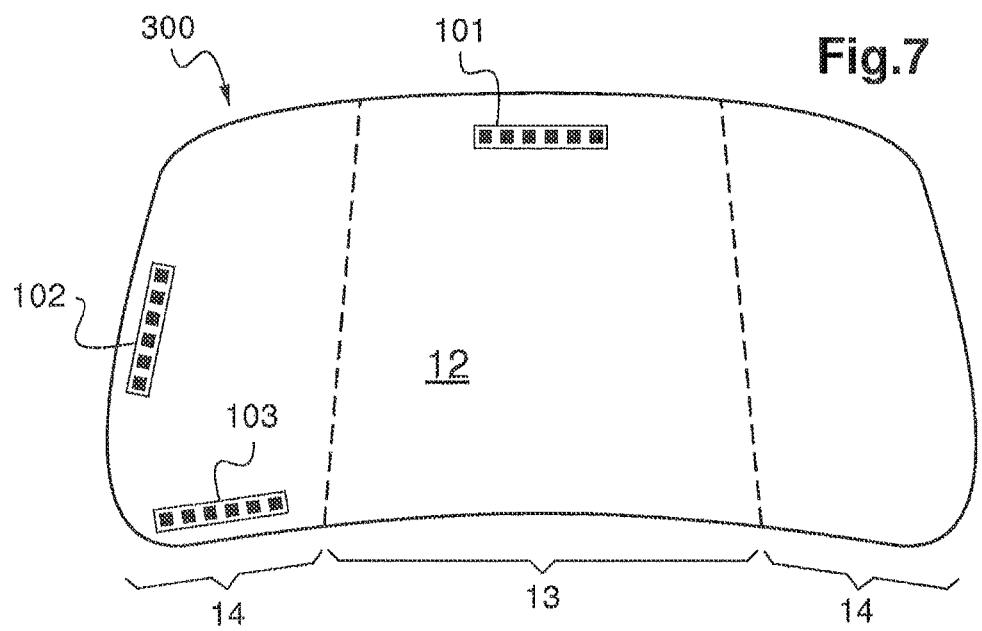

FIG. 7 is a schematic front view of a luminous signaling rear windshield in a third embodiment of the invention.

FIG. 1 shows (as seen from inside the vehicle) a front windshield 100 of an automotive vehicle being driven on a three-lane road with an automobile in front.

The front windshield is a laminated glazing unit with luminous signaling means according to the Invention, namely:

a first set of six diodes 4 on a first PCB printed circuit board integrated between the two glazing panes of the laminated glazing unit, said diodes being in a row and placed in the glazing region in an edge zone of the front windshield along the bottom longitudinal edge and optionally in or in the vicinity of a peripheral masking zone (opaque enamel, etc.) of the exterior glazing pane (not shown) or even in a zone, of the exterior and/or interior glazing pane, containing an alternation of masking zones (opaque layer, such as an opaque enamel) and transparent zones (facing a diode);

a second set of six diodes 4 on a second PCB printed circuit board integrated between the two glazing panes of the laminated glazing unit, said diodes being in a row and placed in the glazing region in an edge zone of the front windshield along the especially driver-side (left-hand) lateral edge and optionally in or in the vicinity of a peripheral masking zone (opaque enamel, etc.) of the exterior glazing pane or even in a zone, of the exterior and/or interior glazing pane, containing an alternation of masking zones (opaque layer, such as an opaque enamel) and transparent zones (facing a diode); and a third set of six diodes 4 on a third PCB printed circuit board integrated between the two glazing panes of the laminated glazing unit, said diodes being in a row and placed in the glazing region in an edge zone of the front windshield along the especially passenger-side (right-hand) lateral edge and optionally in or in the vicinity of a peripheral masking zone (opaque enamel, etc.) of the exterior glazing pane or even in a zone, of the exterior and/or interior glazing pane, containing an alternation of masking zones (opaque layer, such as an opaque enamel) and transparent zones (facing a diode).

The diodes of the first set may in particular emit red light alerting the driver when the automobile in front (or any other means of locomotion or even an animal) is detected to be too close. The red light may be continuous or flash. If the light is chosen to be continuous its intensity may increase as the automobile in front gets closer or from a preset distance said to be of "high-risk". If the light is chosen to flash, its frequency may increase as the automobile in front gets closer or from a preset distance said to be of 'high-risk'.

When the automobile in front is sufficiently far away (a safe distance away) the diodes are turned off.

The diodes of the second set may in particular emit red light alerting the driver when an automobile (or any other means of locomotion or even an animal) is detected to be too close to the left-hand side of the automobile. The red light may be continuous or flash. If the light is chosen to be continuous its intensity may increase as the automobile to the left gets closer or from a preset distance said to be of "high-risk". If the light is chosen to flash, its frequency may increase as the automobile to the left gets closer or from a preset distance said to be of "high-risk". When the automobile to the left is sufficiently far away (a safe distance away) the diodes are turned off.

The diodes of the third set may in particular emit red light alerting the driver when an automobile (or any other means of locomotion or even an animal) is detected to be too close to the right-hand side of the automobile. The red light may be continuous or flash. If the light is chosen to be continuous its intensity may increase as the automobile to the right gets closer or from a preset distance said to be of "high-risk". If the light is chosen to flash, its frequency may increase as the automobile to the right gets closer or from a preset distance said to be of 'high-risk'. When the automobile to the right is sufficiently far away (a safe distance away) the diodes are turned off.

The anti-collision system may be used on any type of road: freeways, urban roads, etc. It may also be used to indicate that an object or pedestrian is too close.

The signaling light may also pass from one color (for example orange or amber) when the vehicle is at a risky distance to another color, red for example, when the vehicle is at a smaller and even more dangerous distance.

In these cases, provision may be made for as many diodes as necessary, for example one row with red and orange diodes in alternation, or one row of diodes per color. It is also possible to make provision for at least three signaling levels (three colors).

The vehicle integrates at least one sensor (preferably one per set of diodes) in order to detect these dangerous situations (unsafe distances, inter-alia) and at least one control unit for piloting the diodes.

The diodes are not necessarily in rows, especially parallel to the edge of the glazing unit.

The one or more PCB boards with diodes may preferably be in the lower half of the front windshield or in the lower driver-side quadrant in particular for signaling requiring an action by the driver. Being in the glazed region, a transparent PCB board is preferred.

FIG. 2 is a schematic cross-sectional view of a luminous signaling front windshield in a first embodiment of the invention, comprising, a curved laminated glazing unit 100 including:

- a first glazing pane 1, for example made of TSA glass and of 2.1 mm thickness, forming the exterior glazing pane, with first and second main faces 11, 12 respectively called face F1 and face F2;
- a lamination interlayer 2 made of polymeric material, here PVB, of preferably submillimeter-sized thickness e1, for example a PVB sheet (RC41 from Solutia or Eastman) of 0.76 mm thickness or as a variant if necessary a (trilayer or quadrilayer) sheet of acoustic PVB, for example of 0.81 mm thickness;
- a second glazing pane 1', forming the interior glazing pane, for example made of TSA (or clear or extra-clear) glass and of 2.1 mm or even 1.6 mm thickness, with third and fourth main faces 11', 12' respectively called face F3 and face F4, face F3 optionally being coated with a functional layer (heating layer, low-E layer, etc.), the face F2 and the face F3 being the internal faces 11, 11' of the laminated glazing unit; and
- a set of six inorganic light-emitting diodes 4, which are surface mount devices (SMDs), for example emitting in the red on a PCB printed circuit board 3, the PCB board+diodes assembly being of total thickness et2≤e1 and better still with e1−et2 of at most 0.5 mm and preferably of 0.1 mm to 0.2 mm, the diodes being of thickness e2 and the PCB board 3 of thickness e'2, with a face called the front face 30 facing the face F3 and a back face 30' against the face F2 or face 11, each diode having an emitting face emitting in the direction of the Interior glazing pane 1', and each diode having an edge face.

For each of the diodes, the lamination interlayer comprises a through-aperture 20 that encircles the edge face of the diode and makes contact with the edge face or as a variant that is spaced apart by at most 0.5 mm and even at most 1 mm from the edge face.

The lamination interlayer is present in the laminated glazing unit between the face F3 and the front face of the PCB board over the entirety of the front face of the PCB ex level with the diodes.

The diodes (with a single semiconductor chip here) are square in shape and of width of about 5 mm or less.

The diodes must not be thicker than the Interlayer in order not to run the risk of weakening the glass by creating points of stress. Furthermore, the diodes must preferably not be too far apart from the glass as this would risk creating too many air bubbles, in particular if the lamination interlayer does not creep so much as to cover the front face (encircled by the optional package) of the diodes and the space between the diodes and face F3.

The thinnest possible and even preferably the discreetest possible flexible PCB board (minimum width or even transparent), for example including a transparent film such as a film of PET, PEN or a polyimide, will be chosen, and, for the printed circuit board, transparent connection tracks may even be chosen (rather than tracks made of copper unless they are made sufficiently thin).

FIG. 2' is a schematic cross-sectional view of a luminous signaling front windshield in one variant of the first embodiment of the invention. The front windshield 200' differs in that the lamination interlayer is also present between the back face of the PCB board and the face F2, and for example is thinner there than on the front-face side. The thickness E1 may or may not be unchanged.

FIG. 3 shows a perspective view of a diode used in the first embodiment illustrated in FIG. 2.

Each diode is an electronic component 40 including a semiconductor chip 41 and an emitting face 41', and is equipped with a peripheral package 42, typically a polymeric or ceramic package, encapsulating the edge face of the component (and defining the edge face of the diode), projecting over the front face of the component and encircling the emitting face.

Here, the emitting face is set back from the front surface 42' of the package that therefore sets the maximum thickness e2 of the diode 4.

The lamination interlayer (via creep) may extend as far as to be between said front surface 42' of the package and the face F3 of the front windshield (or of a face F2 of a side window or rear windshield) generally without reaching the emitting face.

The back face 3' of the PCB board is against the face F2.

As shown in FIG. 4, the PCB board 3 extends as far as to the edge face 10 of the laminated glazing unit and protrudes from this edge face. It has an L-shaped bent shape.

In the zone opening onto the edge face, between the back face 30' and the face F2 is housed an adhesive 6 that is tight to liquid water and, of thickness of at most 0.1 mm and better still of at most 0.05 mm, especially a double-sided adhesive (which is preferably transparent if in the glazed region).

As also shown in FIG. 6, relating to the manufacture of this front windshield, the bent PCB board therefore includes a first (rectangular) portion 31 bearing the diodes 4 (and with the bend) and a (rectangular) second portion 32 for connection, for example two copper tracks 33 with an insulating line 34 opening onto and protruding from the edge face of the laminated glazing unit. This second portion may be (much) longer than the first portion.

Before assembly, the lamination interlayer 2, preferably taking the form of a single PVB sheet, includes through-apertures 20 that are slightly larger than the size of the diodes, preferably larger by at most 0.5 mm (above all if the diodes are mounted manually on their PCB) or even of at most 0.1 mm (above all if the diodes are automatically mounted on their PCB).

FIG. 1*bis* shows another front windshield of an automotive vehicle on a road, which windshield is provided with luminous signaling means according to the invention. It differs from the windshield in FIG. 1 in the more peripheral location of the three PCB boards, which may be opaque (opaque carrier and/or opaque conductive (wires etc.) tracks). As shown in FIG. 2*bis*, the face F2 includes an unapertured masking frame 71, preferably made of black enamel, and the face F4 (or F3) includes a masking frame 72, preferably made of black enamel, with apertures 7' in line with the diodes.

FIG. 1' shows another windshield of an automotive vehicle, which windshield 1000' is provided with luminous signaling means according to the invention. It differs from the windshield in FIG. 1 in the type of signal produced and in the position of the second and third PCB boards.

The first set of diodes 4*c*, on a carrier 30C, forms a triangle with, if possible, a central exclamation mark. It therefore forms a danger warning light.

The second and third sets of diodes 4*a* and 4*b*, on their respective carriers 30*a* and 30*b*, form arrows indicating that the respective indicator has been activated.

In a second embodiment, shown in FIG. 5, the front windshield 200 differs in that the back face 30' is adhesively bonded to the face F2 by a preferably transparent double-sided adhesive 5 of thickness e3 to e3+e'2 of at most 0.15 mm and better still 0.1 mm and in particular e3<0.05 mm, the entire length (and width) of the PCB board or at least the zone with the diodes being adhesively bonded.

FIG. 7 is a schematic front view (face-F1 or face-12 side) of a luminous signaling rear windshield 300 in a third embodiment of the invention.

In the central zone 13 a third stop light 101 is formed with, for example, six red diodes on the PCB board along the top longitudinal edge.

In each lateral zone 14, an indicator 102 is formed for example with six diodes emitting in the yellow on the PCB board along the lateral edge in question, or even a signaling light 103 with for example six diodes on the PCB board along the lower longitudinal edge in question.

The laminated glazing unit illustrated in FIG. 2 could be used again by inverting the position of the PCB: its back face would then be against the face F3.

Alternatively, a side repeater is formed on a side window in the same way.

The invention claimed is:

1. A vehicle luminous signaling glazing unit forming a vehicle front windshield comprising:
   a laminated glazing unit including:
      a first glazing pane, forming an exterior glazing pane, with first and second main faces;
      a lamination interlayer made of a polymeric material of thickness e1 of at most 1.8 mm; and
      a second glazing pane, forming an interior glazing pane, with third and fourth main faces,
   the second main face of the first glazing pane and the third main face of the second glazing pane being the internal faces of the laminated glazing unit; and
      a set of inorganic light-emitting diodes positioned on a front face, facing the third main face of the second glazing pane, of a PCB printed circuit board, an assembly of the PCB printed circuit board and inorganic light-emitting diodes being of total thickness et2, the inorganic light-emitting diodes being of thickness e2 and the PCB printed circuit board being of thickness e'2,
   each light-emitting diode having an emitting face configured to emit in a direction of the interior glazing pane, and each light-emitting diode having an edge face, the inorganic light-emitting diodes being configured to emit signaling light,
   the lamination interlayer having a through-aperture,
   wherein for each of the light-emitting diodes, the lamination interlayer comprises a through-aperture encircling the edge face of the light-emitting diode and wherein the lamination interlayer is between the third main face of the second glazing pane and the front face of the PCB printed circuit board and wherein et2≤e1.

2. A vehicle luminous signaling glazing unit, chosen from a rear windshield and a side window, comprising:
   a laminated glazing unit including:
      a first glazing pane, forming an exterior glazing pane, with first and second main faces;
      a lamination interlayer made of a polymeric material of thickness e1 of at most 1.8 mm; and
      a second glazing pane, forming an interior glazing pane, with third and fourth main faces,
   the second main face of the first glazing pane and the third main face of the second glazing pane being internal faces of the laminated glazing unit; and
      a set of inorganic light-emitting diodes positioned on a front face, facing the second main face of the first glazing pane, of a PCB printed circuit board, an assembly of the PCB printed circuit board and inorganic light-emitting diodes being of total thickness et2, the inorganic light-emitting diodes being of thickness e2 and the PCB printed circuit board being of thickness e'2,
   each light-emitting diode having an emitting face configured to emit in a direction of the exterior glazing pane, and each light-emitting diode having an edge face, the inorganic light-emitting diodes being configured to emit signaling light, the lamination interlayer having a through-aperture,
   wherein for each of the light-emitting diodes, the lamination interlayer comprises a through-aperture encircling the edge face of the light-emitting diode, wherein the lamination interlayer is between the second main face of the first glazing pane and the front face of the PCB printed circuit board and wherein et2≤e1.

3. The vehicle luminous signaling glazing unit as claimed in claim 1, wherein the lamination interlayer is spaced apart by at most 0.5 mm from the edge face of the light-emitting diodes.

4. The vehicle luminous signaling glazing unit as claimed in claim 1, wherein e1 is subcentimeter-sized and e1−et2<0.5 mm.

5. The vehicle luminous signaling glazing unit as claimed in claim 1, wherein each light-emitting diode is an electronic component including a semiconductor chip, and is equipped with a peripheral package encapsulating the edge face of the electronic component, said package defining the edge face of the light-emitting diode, projecting over the front face of the component and encircling the semiconductor chip, and wherein the lamination interlayer extends as far as to be between a front surface of the package and the third main face of the second glazing pane of the front windshield without making contact with the emitting face.

6. The vehicle luminous signaling glazing unit as claimed in claim 2, wherein each light-emitting diode is an electronic component including a semiconductor chip, and is equipped with a peripheral package encapsulating the edge face of the electronic component, said package defining the edge face of the light-emitting diode, projecting over the front face of the component and encircling the semiconductor chip, and wherein the lamination interlayer extends as far as to be between a front surface of the package and the second main face of the first glazing pane without making contact with the emitting face.

7. The vehicle luminous signaling glazing unit as claimed in claim 1, wherein the lamination interlayer is made of PVB with e1 ranging from 0.7 to 0.9 mm, the light-emitting diodes are components surface mounted on the front face of the PCB printed circuit board, e'2 being at most 0.15 mm.

8. The vehicle luminous signaling glazing unit as claimed in claim 1, wherein the PCB printed circuit board is adhesively bonded or pressed against the second main face of the first glazing pane for the front windshield, with an adhesive of thickness e3≤0.1 mm.

9. The vehicle luminous signaling glazing unit as claimed in claim 1, wherein the lamination interlayer is between a back face of the PCB printed circuit board and the second main face of the first glazing pane for the front windshield.

10. The vehicle luminous signaling glazing unit as claimed in claim 1, wherein the light-emitting diodes are power diodes that in operation are under supplied electrically with current so as to maintain a temperature below the softening temperature of the polymeric material of the lamination interlayer.

11. The vehicle luminous signaling glazing unit as claimed in claim 1, wherein the PCB printed circuit board includes a plastic film provided with conductive tracks and is equipped with surface mount diodes.

12. The vehicle luminous signaling glazing unit as claimed in claim 1, wherein the PCB printed circuit board is placed in a region of the front windshield, region in which the exterior glazing pane is rendered opaque by an opaque layer and/or in which the interior glazing pane is rendered opaque by an opaque layer and then including apertures at least in line with the diodes.

13. The vehicle luminous signaling glazing unit as claimed in claim 1, wherein the front windshield includes on the third main face of the second glazing pane or the fourth main face of the second glazing pane facing the diodes a scattering layer, optionally forming a pictogram.

14. The vehicle luminous signaling glazing unit as claimed in claim 1, wherein the PCB printed circuit board extends at least as far as to the edge face of the laminated glazing unit, and wherein between a back face of the PCB printed circuit board and the second main face of the first glazing pane of the front windshield is housed an adhesive that is tight to liquid water and of thickness of at most 0.1 mm.

15. A vehicle including at least one luminous signaling glazing unit as claimed in claim 1, wherein the luminous signaling glazing unit forms a front windshield and is an anti-collision device.

16. A process for manufacturing the luminous signaling glazing unit as claimed in claim 1, comprising:
automatically cutting a lamination interlayer taking the form of a single sheet of at most 0.9 mm thickness to form local through-apertures or, the lamination interlayer including a first sheet and a second sheet, automatically cutting the first sheet of at most 0.9 mm thickness to form local through-apertures; and
assembling the laminated glazing unit, with through-apertures larger than the size of the diodes, the optional second sheet being between the back face of the PCB board and the second main face of the first glazing pane of the front windshield.

17. The vehicle luminous signaling glazing unit as claimed in claim 3, wherein the lamination interlayer makes contact with the edge face of the light-emitting diodes.

18. The vehicle luminous signaling glazing unit as claimed in claim 4, wherein e1−et2 ranges from 0.1 to 0.3 mm.

19. A vehicle including at least one luminous signaling glazing unit as claimed in claim 2, wherein the luminous signaling glazing unit forms the rear windshield and is a glazing unit including a stop light or a third stop light, or the luminous signaling glazing unit forms a side window and is a glazing unit including a hazard warning light or a light for locating the vehicle or a side repeater.

20. The vehicle luminous signaling glazing unit as claimed in claim 2, wherein the PCB printed circuit board is adhesively bonded or pressed against the third main face of the second glazing pane by an adhesive of thickness e3≤0.1 mm.

21. The vehicle luminous signaling glazing unit as claimed in claim 2, wherein the lamination interlayer is between a back face of the PCB printed circuit board and the third main face of the second glazing pane.

22. The vehicle luminous signaling glazing unit as claimed in claim 11, wherein the plastic film is made of polyethylene terephthalate or polyimide.

23. The vehicle luminous signaling glazing unit as claimed in claim 12, wherein the opaque layer is made of enamel.

24. The vehicle luminous signaling glazing unit as claimed in claim 2, wherein the PCB board is placed in a region in which the interior glazing pane is rendered opaque by an opaque layer and/or in which the exterior glazing pane is rendered opaque by an opaque layer and then including apertures at least in line with the diodes.

25. The vehicle luminous signaling glazing unit as claimed in claim 24, wherein the opaque layer is made of enamel.

26. The vehicle luminous signaling glazing unit as claimed in claim 14, wherein the PCB printed circuit board has a bent shape.

27. A vehicle luminous signaling glazing unit, comprising:
a laminated glazing unit including:
a first glazing pane, forming an exterior glazing pane, with first and second main faces;
a lamination interlayer made of a polymeric material of thickness e1 of at most 1.8 mm; and
a second glazing pane, forming an interior glazing pane, with third and fourth main faces,
the second main face of the first glazing pane and the third main face of the second glazing pane being internal faces of the laminated glazing unit; and
a set of inorganic light-emitting diodes positioned on a front face, facing the second main face of the first glazing pane, of a PCB printed circuit board, an assembly of the PCB printed circuit board and inorganic light-emitting diodes being of total thickness et2, the inorganic light-emitting diodes being of thickness e2 and the PCB printed circuit board being of thickness e'2,
each light-emitting diode having an emitting face configured to emit in a direction of the exterior glazing pane, and each light-emitting diode having an edge face, the inorganic light-emitting diodes being configured to emit signaling light, the lamination interlayer having a through-aperture, wherein for each of the light-emitting diodes, the lamination interlayer comprises a through-aperture encircling the edge face of the light-emitting diode, wherein the lamination interlayer is between the second main face of the first glazing pane and the front face of the PCB printed circuit board and wherein et2≤e1.

28. The vehicle luminous signaling glazing unit as claimed in claim 27, wherein the glazing unit is a rear windshield or a side window.

* * * * *